Patented Aug. 25, 1942

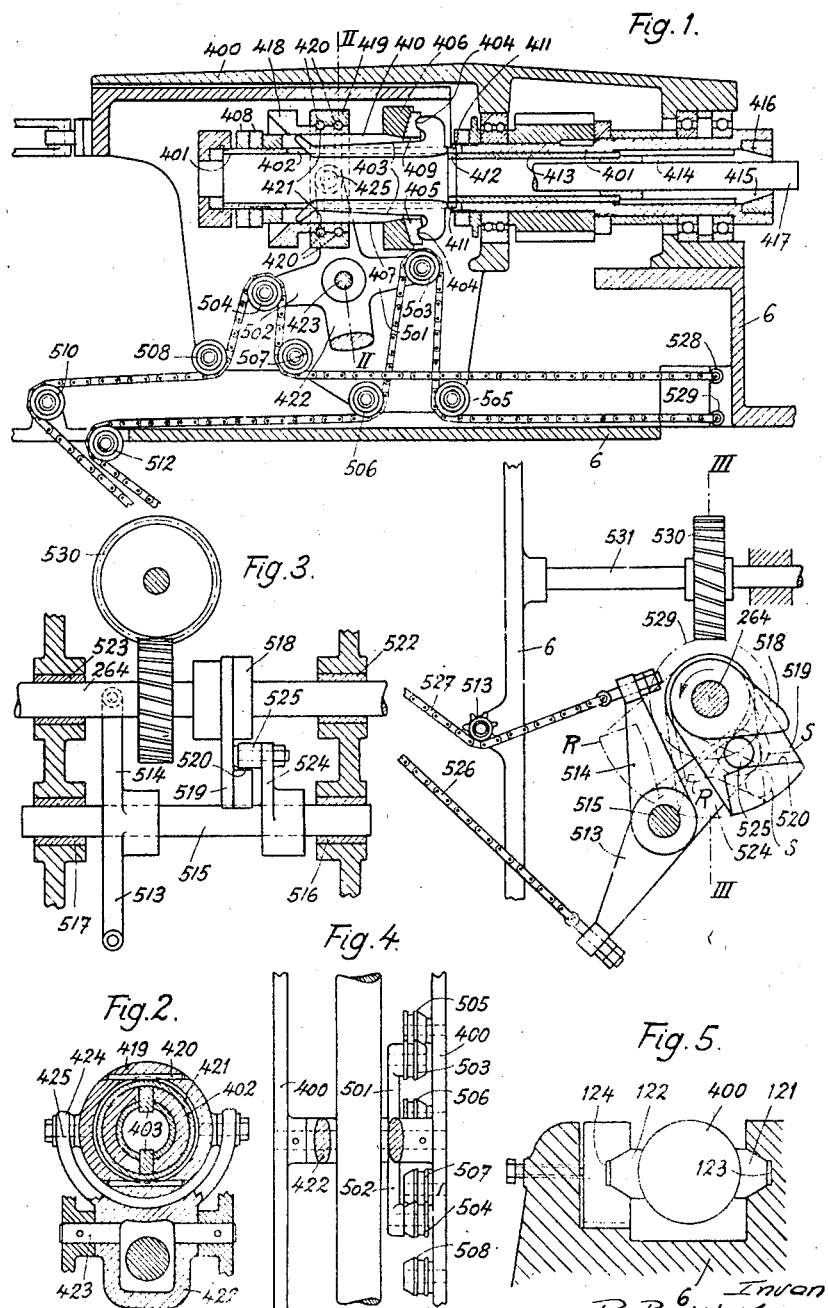

2,294,017

UNITED STATES PATENT OFFICE 2,294,017

AUTOMATIC LATHE

Philippe Boillat, Tavannes, Switzerland, assignor to the firm Tavannes Machines Co. S. A., Tavennes, Switzerland, a joint-stock company of Switzerland Application October 24, 1940, Serial No. 362,663
In Great Britain October 30, 1939

3 Claims. (Cl. 82—28)

The present invention relates to automatic lathes.

Its purpose is to provide a simple and advantageous device for operating the clamping mechanism in a head stock, specially but not exclusively in a movable head stock.

An object of the invention is to provide a rocking member on said head stock, adapted to drive an operating member controlling the clamping mechanism and a stationarily arranged rocking member intermittently swung by a suitable stationarily arranged driving means and suitable transmitting means transmitting the motions of the stationarily arranged rocking member to that mounted on the head stock.

Another object is to drive the rocking member on the head-stock by a chain drive rotating said rocking member in the one and in the other direction.

A further object is to provide as a stationarily arranged driving means cams and stationarily arranged rocking levers cooperating with said cams.

It is advantageous, but not necessary, to make use of applicant's particular mode of guiding the head stock by means of two laterally arranged guides as shown in a copending application, and to mount the rocking member on the lower side of the head stock.

Other objects and features will be apparent as the following description proceeds reference being had to the accompanying drawing in which Fig. 1 is a side view of the mechanism, partly in section.

Fig. 2 is a section taken on line II—II of Fig. 1.

Fig. 3 is a section taken on line III—III of Fig. 1.

Fig. 4 is a view from above of the several rollers on the head stock and

Fig. 5 is a schematic front view of a head stock, illustrating in what manner the head stock in Fig. 1 can be slidably mounted.

The drawing shows the back part of the movable head stock 400 and of the spindle 401, mounted on the head stock. This head stock may be slidably mounted on the frame 6 by means of lateral slide members 121, 122 and corresponding guide, channels 123, 124, forming the object of a copending application and being illustrated in a purely schematic way in Fig. 5. Slots 402 are provided on the spindle, parallel to its axis, said slots making room for the clamping levers 403. These levers are held in the seatings 404 of the ring 405 which fits the flange 406 of the sleeve 407 mounted on the spindle 401. This sleeve is locked against axial movement with the help of the safety nuts 408 screwed to the end of the spindle. Ring 405 and sleeve 407 have slots 409 and 410 lying in the plane of the slots 402 of the spindle. The clamping levers 403 bear against the heads 411 screwed to a ring 412 disposed between these levers and a slidable actuating tube 413 inserted into the spindle 401. A longitudinally slotted collet 414 is engaged by one end of the actuating tube 413. The collet comprises a tapered head 415 which fits within a tapered ring 416 fixed to the spindle. Upon movement of the actuating tube 413 by the levers 403 forwardly (to the right in Fig. 1), the conical head is forced into the tapered ring 416 and is thereby contracted. This action causes the collet to grip the work piece 417. A sliding cone 418 is mounted on the sleeve 407, said cone serving to bring the levers 403 in and out of clamping position by sliding on said sleeve 407. A ring 419 is mounted on said cone by means of pins 420 secured to the ring 419 and engaging circular grooves 421 of the cone so as to allow the cone to rotate as on a bearing. A rocking lever 422 is pivotally mounted on the head stock 400 by means of the bolts 423 (Fig. 2). The forked ends 424 of the lever 422 are pivotally connected with the ring 419 by means of the pins 425. This lever 422 is provided with two arms 501 and 502 carrying chain rollers 503, 504 respectively. Other rollers 505, 506, 507 and 508 are mounted on the head stock by means of bolts. Further chain rollers 510, 512 and 513 are pivotally fixed to the frame 6. Levers 513 and 514 are secured to a shaft 515 journaled on bearings 516, 517 (Fig. 3). To the ends of the levers 513 and 514 chains 526, 527 are attached, the one, 526, running from the lever 513 over rollers 510, 508, 504, 507 to stationary point 528 and the other 527, from lever 514 over rollers 513, 512, 506, 503, 505 to stationary point 529. A cam 518 and a lever 519 carrying a cam path 520 are fixed to the shaft 264 mounted on bearings 522, 523 (Fig. 3). Cam 518 and lever 519 are adapted to rotate at such a speed as to provide for a very quick clamping and releasing of the work piece by the collet 414. Another lever 524 is fixed to the shaft 515 and carries a pin or a roller 525 adapted to cooperate alternately with the cam 518 and the cam path 520. Shaft 264 may be continuously or intermittently driven by means of the helical wheels 529, 530, preferably at a speed higher than that of the cam-shaft driving the tools of the lathe, in order to reduce the time lost by clamping and releasing to the smallest amount possible. In the case of intermittent rotation shaft 531 would be coupled with a disengaging coupling, for instance, of the kind shown in my copending applications. Even in a case where the shaft 264 is continuously driven it must be connected with its drive by a disengaging coupling, in order that it may be disconnected from its drive when the tools are to be adjusted.

The mode of operation of this clamping mechanism is as follows:

Shaft 264 with cam 518 and lever 519 rotate in an anti-clockwise direction (Fig. 1). The mutual position of cam path 520 and pin 525 shown in full lines in Fig. 1 is that in which levers 513, 514 and 524 are in their outermost left hand position. Chain 526 has then pulled lever 422 to its outermost left hand position shown in Fig. 1. Lever 422 has brought cone 418 into its extreme left hand position. Clamping levers 403 have been turned inwards, the conical head of the collet is thus forced into the tapered ring 416 and thereby contracted. Shaft 264 goes on rotating in an anti-clockwise direction. As soon as cam 518 strikes against pin 525 which position R is indicated in dotted lines in Fig. 1 this cam begins to move lever 524 and with it levers 513, 514 in a clockwise direction. Chain 527 pulls lever 422 in a clockwise direction and cone 418 thus moves to the right; clamping levers 403 and the collet are released. The work piece may now be pushed forward by the usual means. At the end of this releasing operation cam 518 and pin 525 are in the mutual position S shown in dotted lines in Fig. 1. On further rotation of shaft 264 cam path 520 comes into cooperation with pin 525 and levers 524, 513, 514 are brought into their outermost left hand position. Pin 525 and cam path 520 are now again in the position shown in full lines in Fig. 1. The work piece is again clamped by the collet 414. On further rotation of shaft 264 the above cycle of operations is repeated.

It is understood that the drawing shows the principle in a schematic way only and that the invention is not limited to the embodiment described and illustrated as various changes may be resorted to without leaving the scope of the invention or sacrificing any of its advantages.

What I claim is:

1. In an automatic lathe, a head stock adapted to traverse longitudinally, a clamping mechanism on said head stock, adapted to clamp and release a work piece, a slidable operating member adapted to control said clamping mechanism, a first rocking member mounted on said head stock and adapted to drive said operating member, a stationarily arranged rocking member, a driving means adapted to swing said stationarily arranged rocking member intermittently, and transmitting means constantly connecting said stationarily arranged rocking member with said first rocking member for transmitting the motions of said stationarily arranged rocking member to said first rocking member.

2. In an automatic lathe, a frame, a head stock adapted to traverse longitudinally, a clamping mechanism on said head stock, adapted to clamp and release a work piece, a slidable operating member adapted to control said clamping mechanism, a first rocking member mounted on said head stock and adapted to drive said operating member, a stationarily arranged rocking member, a cam adapted to swing said stationarily arranged rocking member intermittently, and flexible members on the one end attached to said frame and on the other end to said stationarily arranged rocking member, said flexible members, capable of being stretched by said stationarily arranged rocking member, engaging said first rocking member so as to be adapted to rotate the latter in the one and in the other direction when stretched by said stationarily arranged rocking member.

3. In an automatic lathe, a frame, a head stock adapted to traverse longitudinally, a clamping mechanism on said head stock, adapted to clamp and release a work piece, a slidable operating member adapted to control said clamping mechanism, a first rocking member mounted on said head stock and adapted to drive said operating member, a stationarily arranged rocking member, a cam adapted to swing said stationarily arranged rocking member intermittently, rollers mounted on said frame, said head stock and said first rocking member, and two chains each on the one end attached to said frame and on the other end to said stationarily arranged rocking member and laid over said rollers so as to form a variable bow between the rollers on said head stock and on said first member, so as to be adapted to rotate the latter in the one and in the other direction when stretched by said stationarily arranged rocking member.

PHILIPPE BOILLAT.